US012139373B2

(12) United States Patent
Liebetrau

(10) Patent No.: US 12,139,373 B2
(45) Date of Patent: Nov. 12, 2024

(54) ELEVATOR SYSTEM

(71) Applicant: Inventio AG, Hergiswil (CH)

(72) Inventor: Christoph Liebetrau, Menziken (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/003,164

(22) PCT Filed: Jun. 23, 2021

(86) PCT No.: PCT/EP2021/067066
§ 371 (c)(1),
(2) Date: Dec. 23, 2022

(87) PCT Pub. No.: WO2022/002704
PCT Pub. Date: Jan. 6, 2022

(65) Prior Publication Data

US 2023/0257233 A1 Aug. 17, 2023

(30) Foreign Application Priority Data

Jun. 30, 2020 (EP) .................................... 20183131

(51) Int. Cl.
*B66B 3/02* (2006.01)
*B66B 1/46* (2006.01)
*B66B 13/30* (2006.01)

(52) U.S. Cl.
CPC ............ *B66B 3/023* (2013.01); *B66B 13/303* (2013.01); *B66B 1/468* (2013.01); *B66B 2201/463* (2013.01)

(58) Field of Classification Search
CPC ....... B66B 3/023; B66B 13/303; B66B 1/468; B66B 11/02; B66B 13/06
See application file for complete search history.

(56) References Cited

U.S. PATENT DOCUMENTS 4,032,882 A * 6/1977 Mandel .................. B66B 3/023 340/332
5,587,567 A 12/1996 Winter et al.
6,116,381 A 9/2000 Jalbert

FOREIGN PATENT DOCUMENTS

| | | | | | |
|---|---|---|---|---|---|
| CN | 2885803 | Y | * | 4/2007 | |
| CN | 203284020 | U | * | 11/2013 | |
| CN | 110194400 | A | | 9/2019 | |
| DE | 10347424 | A1 | * | 5/2005 | ............ B32B 17/06 |
| DE | 112013004963 | T5 | * | 7/2015 | ............ B66B 13/26 |
| EP | 1609753 | A1 | | 12/2005 | |
| JP | S5296861 | U | | 7/1977 | |

(Continued)

OTHER PUBLICATIONS

Machine Translation of DE 10347424.*
Machine Translation of KR 100922637.*
Machine Translation of KR 101870568.*

*Primary Examiner* — Diem M Tran
(74) *Attorney, Agent, or Firm* — William J. Clemens; Shumaker, Loop & Kendrick, LLP

(57) ABSTRACT

A landing door of an elevator system includes a door leaf equipped with an integrated floor indicator that signals to a person the floor on which an elevator car approaching the exit floor is currently located. The door leaf of the landing door has a wall element made of sheet metal with a microperforated indicator sector and actuatable light sources arranged in the indicator sector behind the wall element to form the floor indicator.

14 Claims, 6 Drawing Sheets

(56) References Cited

FOREIGN PATENT DOCUMENTS

| | | | | | |
|---|---|---|---|---|---|
| JP | H02282174 | A | | 11/1990 | |
| JP | H06171850 | A | | 6/1994 | |
| JP | H11246138 | A | | 9/1999 | |
| JP | 2003335469 | A | * | 11/2003 | ............... B66B 3/00 |
| KR | 100922637 | B1 | * | 10/2009 | |
| KR | 20120058707 | A | | 6/2012 | |
| KR | 101870568 | B1 | | 6/2018 | |
| WO | 2014067895 | A1 | | 5/2014 | |
| WO | 2017115099 | A1 | | 7/2017 | |
| WO | WO-2019043763 | A1 | * | 3/2019 | |
| WO | 2019171560 | A1 | | 9/2019 | |

* cited by examiner

ELEVATOR SYSTEM

FIELD

The invention relates to an elevator system. The elevator system for transporting passengers or goods has an elevator car that is movable between floors in an elevator shaft. At least one landing door for closing the elevator shaft is provided on at least one floor. The invention further relates to a door leaf for such a landing door or another wall panel with a display function for an elevator system.

BACKGROUND

Elevator systems for the transportation of people and goods have been known and used for a long time. Call registering units are often arranged on the floors for inputting a floor call. After a person has made a floor call from an exit floor, the elevator car travels to this floor. A floor indicator, usually integrated in the frame of the landing door, signals to the person the floor on which the elevator car approaching the exit floor is currently located.

SUMMARY

It is an object of the present invention to provide an elevator system having an improved or alternative floor indicator.

These and other objects are achieved according to the invention with an elevator system having the features described herein. The elevator system for transporting people or goods can comprise an elevator car that is movable between floors in an elevator shaft. The elevator system further comprises a landing door comprising a door leaf through which the elevator car is accessible from the floor. The elevator system can then have an elevator control unit for operating the elevator system, wherein the elevator control unit controls in particular a drive unit for moving the elevator car. On the floor side, operating units can be provided, in particular in the form of call registering units for inputting a floor call. The floor indicator can signal to the person the floor on which the elevator car approaching the exit floor is currently located. Since the floor indicator is variable and can show different indicators such as the mentioned current car position, the term "dynamic floor indicator" is also used below.

The door leaf has a floor indicator, preferably arranged in an edge and/or corner region, for displaying floor information. The floor information signals to the person on the floor who called the elevator car the floor on which the elevator car is currently located. The dynamic floor indicator can additionally comprise a direction indicator, which indicates the direction in which the elevator car is currently moving. The door leaf with such a floor indicator is an advantageous door leaf with a display function. Another floor indicator could indicate which—if a destination call control is present—destination floor was selected after a destination call was made from an input unit located on the floor.

The door leaf can be part of an electrically driven landing door for opening and closing the landing door. In particular, the door leaf can be a sliding door leaf.

The door leaf has a wall element, preferably made of sheet metal and particularly preferably of a steel or aluminum sheet, for defining the supporting structure of the door leaf and for covering the shaft access. The wall element can define a front side facing the floor. For the floor indicator, the wall element has a microperforated indicator sector preferably arranged in an edge and/or corner region. The microperforated indicator sector comprises a plurality of light passage openings with such small dimensions that they are barely visually perceptible at least at a distance of a few meters from the elevator user if the floor indicator is not activated or is in the idle state. For the floor indicator, at least one actuatable light source arranged behind the wall element is installed in the door leaf in the region of the microperforated indicator sector, with which at least one light source the floor on which the elevator car is currently located can be displayed after corresponding actuation.

The microperforated indicator sector can be covered by a transparent layer. The transparent layer can be a polyester film, for example. However, it is also conceivable to use a thin sheet of plastic or glass, which is attached to the wall element.

The floor indicator integrated in the door leaf in this manner provides the user of the elevator system with a visually advantageous and safe perception of the indicator of the desired floor information. The result is intuitive user guidance concerning the information as to where the car currently is or where it is moving to. Particularly if the described cover film is provided, the floor indicator is characterized by the effect of a surprise for the first-time user. At first, hardly anything can be seen on the landing door, but suddenly—after the car call has been made—an indicator can be seen on the door leaf. Another advantage of the microperforation is that undesirable contamination of the indicator sector, for example by dust deposits, can be prevented. Thanks to the microperforated indicator sector in the wall element decorative layer, the floor indicator is also vandal-proof, and the visible front side of the door leaf can be easily cleaned. Thanks to the microperforated indicator sector, even stringent requirements for fire safety of the landing door can be met.

The door leaf can optionally have a decorative layer that preferably completely covers at least the front side of the wall element, which is free or visible when the landing door is closed. The decorative layer can be, for example, a layer of paint or lacquer. Film materials that are bonded to the wall element by adhesive, for example, are also conceivable as the decorative layer. The decorative layer, like the wall element, has light passage openings. To create congruent light passage openings, the microperforation in the region of the indicator sector is preferably made only after the decorative layer has been applied to the wall element.

The decorative layer can comprise a plastic film, a real wood veneer, a lacquer layer or another thin layer of another material. A laminate can also be used as the decorative layer. The plastic film can be a single-layer or multilayer film. The color and surface structure of the decorative layer can be selected depending on the aesthetic requirement profile. For example, the plastic film can have a wood look. Plastic wallpaper is also conceivable as the decorative layer.

Such decorative layers are inexpensive and easy to acquire and use. For example, self-adhesive plastic films, which can be attached to the wall element rapidly and without great effort, can be used. The plastic film for the decorative layer can be made of PE, PP or PVC material, for example.

The decorative layer can be less than 1 mm thick. The sheet thickness of the wall element and thus also the depth of the light passage openings can be, for example, 1 mm to 5 mm, preferably 1.5 mm to 3 mm.

To create the microperforated indicator sector, the wall element can have a plurality of holes, slits or other openings as appropriate in this region. Such light passage openings in the form of holes or slits can be made in the wall element by punching processes or laser drilling processes.

The microperforated indicator sector in the wall element with light passage openings defined by preferably round holes can form or have a perforated screen structure. The perforated screen structure is characterized by the fact that it preferably has holes distributed regularly over the area of the rectangle in the rectangular indicator sector, for example. In other words, the perforated screen structure corresponds to a type of dot grid. The perforated screen structure can be made in the wall element by punching or laser drilling processes, for example. A door leaf with a wall element with a perforated screen structure in the indicator sector is characterized by favorable visual properties in terms of displaying floor information, while ensuring stringent requirements for the stability and durability of the door leaf.

The light passage openings may be oval, circular, rectangular holes or holes with other hole shapes. The visual appearance of the floor indicator can be influenced by the shape of the light passage openings.

The light passage openings of the microperforated indicator sector can be created by round holes with a diameter of 0.3 mm to 1 mm in the wall element.

The light passage openings of the indicator sector may also be formed by slits as an alternative to holes. The microperforated indicator sector can thus have a plurality of light passage openings in the form of slits running preferably parallel to one another in the wall element, wherein the slit width of the slits is less than 1 mm. The slits can run in a vertical direction and preferably extend over the entire height of the indicator sector. The slits can thus define a line grid structure. Of course, other slit directions are also conceivable in addition to the vertical line grid. The slit width can preferably be between 0.3 mm and 1 mm. For certain applications, however, even smaller slit widths are conceivable.

The indicator sector can occupy a limited area on the front side of the door leaf, wherein, advantageously, the area assigned to the indicator sector occupies no more than 20% of the total area of the front side of the door leaf.

The indicator sector can be designed to be rectangular, for example. The rectangle is preferably oriented in the door leaf in such a manner that the sides have a horizontal or vertical course. For example, the rectangle can have a width (horizontal side length) of maximum 20 cm and a height (vertical side length) of maximum 20 cm.

For the floor indicator, a plurality of light sources arranged on one level can be installed in the door leaf in the indicator sector. The light sources may produce white light. However, it would also be conceivable that, in order to create color effects, the light sources or part of the light sources are color-switchable light sources.

The light source can be an LED. If a plurality of light sources is provided, the light sources can form a planar LED array. The LED array can include at least one circuit board holding the LEDs, wherein the circuit board has means with light reflective properties provided on its side supporting the LEDs. The LED array can be formed from a plurality of board modules equipped with LEDs, wherein the board modules can, for example, be strip-shaped. To create color effects, the LED array can be equipped with LEDs emitting light in different color spectra. Instead of an LED array, OLED films could also be provided. An RGB LED can be used as the LED.

To display the floor information, each light source can be activated and deactivated individually. The situation in which the light source is deactivated corresponds to an idle state. The light sources may also be grouped together, wherein the light sources can be activated and deactivated in groups to display the floor information. Floor information can thus be visually displayed easily and rapidly. The floor information can be a number, for example. The floor information could additionally or, if necessary, alternatively be a direction indicator in the form of an arrow, triangle or "V."

The light source can be positioned directly behind a light passage opening. However, it is also conceivable that the light source could be positioned not directly behind a light passage opening, i.e. offset from the opening.

One light source can be assigned in each case to a majority of the light passage openings and preferably to each of the light passage openings.

For the efficient operation of the floor indicator, it can be advantageous if a light guide layer is arranged in the indicator sector between the at least one light source and the wall element. This light guide layer can be a diffusion film or an acrylic plate that emits light.

The light guide layer can be defined by a common or single component. Alternatively, it can also be advantageous if the light guide layer is constructed from a plurality of light guide layer modules.

For the latter case in particular, it can be advantageous if one light source is provided for a plurality of light passage openings in each case, wherein light guide layer modules are assigned to the light passage openings belonging together in this manner.

The door leaf can further comprise an operating unit, in particular an operating unit in the form of a call registering unit for inputting a floor call. With the combination of floor indicator and operating unit in the same door leaf, user guidance can be optimized once again and designed intuitively. With such an arrangement, there is no need to provide operating units on the door frames, separate operating terminals or building walls on the floors, which has a positive effect on the installation time and effort of the elevator system. This variant is also cost-effective.

Advantageously, the operating unit on the one hand and the floor indicator on the other are placed in regions in the door leaf spaced apart from one another. The indicator region for the floor indicator can be arranged in an upper region of the door leaf; the operating region assigned to the operating unit can be arranged in a central region of the door leaf. The door leaf, which is rectangular in front view, can have two longitudinal sides and transverse sides interconnecting the longitudinal sides, wherein, when the door leaf is installed in the elevator system, the transverse sides are horizontal and the longitudinal sides are vertical. For example, the indicator region for the floor indicator can be arranged in an upper corner region facing an outer longitudinal side of the door leaf; while the operating region assigned to the operating unit is arranged at approximately mid-height in the region of an inner longitudinal side opposite the outer longitudinal side.

Finally, another aspect of the invention relates to a door leaf for a landing door of the elevator system described above. However, the arrangement comprising a wall element with a microperforated indicator sector and at least one actuatable light source arranged in the region of the microperforated indicator sector behind the wall element is advantageous not only for door leaves, but also for other application purposes in an elevator system. As an alternative to the door leaf of the landing door described above, this arrangement can thus also be used in other application locations of an elevator system. The arrangement can be designed as a wall panel with a floor indicator, which forms a wall element of an elevator car. However, such a wall panel or a similar wall panel could also be used as a car ceiling. Instead of a floor indicator, other visual indicators are also conceivable. The indicator integrated into the wall panel could, for example, be used to convey information to the elevator user to pass the time during a car journey, or to display special varying light patterns for optimum ride comfort for the user.

In the context of the present description, the term "wall panel for an elevator system" should be understood to mean panels for various boundaries of elevator shafts and elevator cars, i.e. not only panels for side walls, but also for floors, ceilings, doors or door leaves and windows. The components referred to as wall panels do not have to be geometrically exactly, only approximately panel-shaped.

DESCRIPTION OF THE DRAWINGS

Further individual features and advantages of the invention can be derived from the following description of exemplary embodiments and from the drawings. The following are shown.

DETAILED DESCRIPTION

Figure 1:
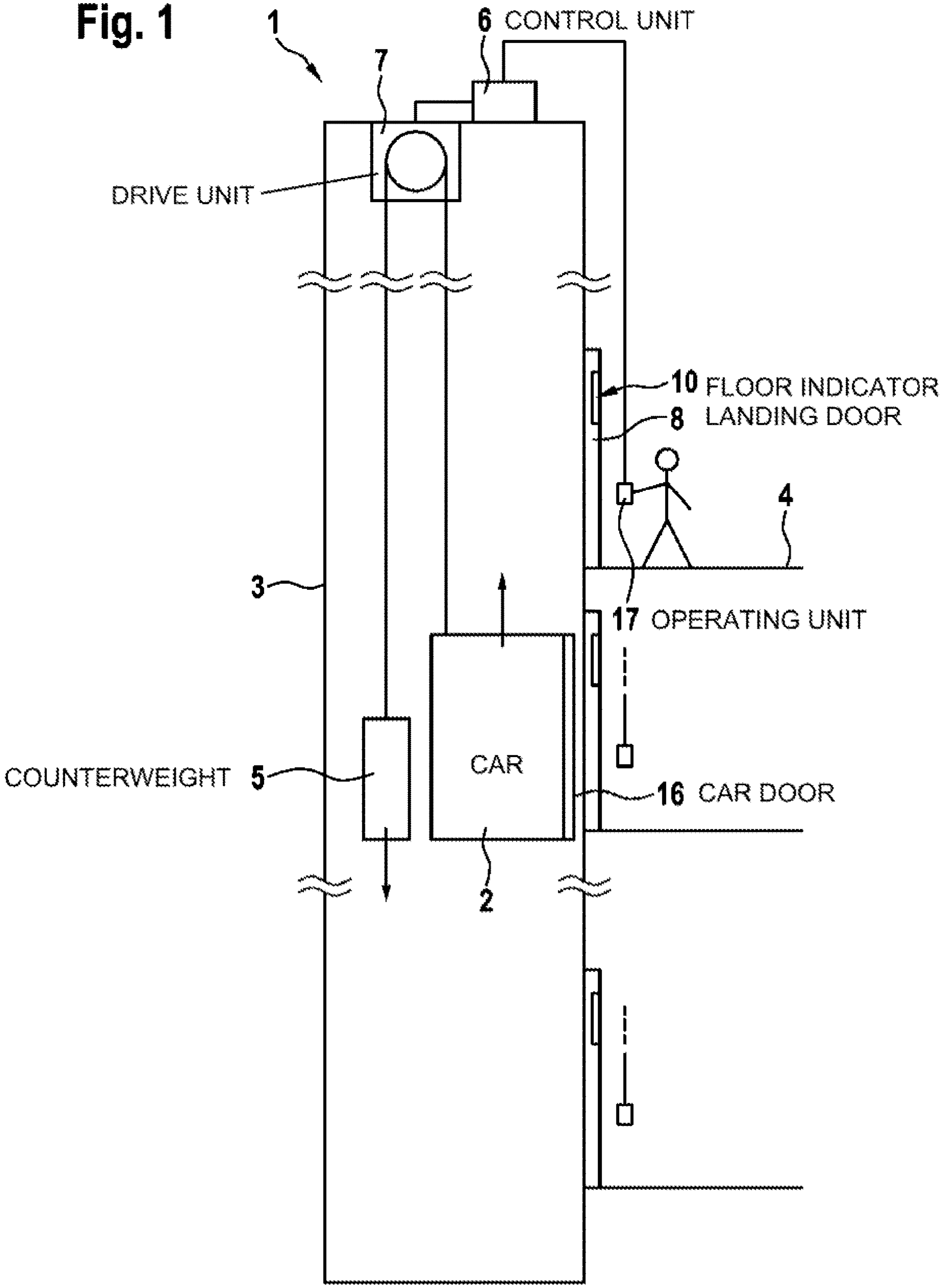
FIG. 1 is a simplified representation of an elevator system in a side view.

FIG. 1 shows an elevator system, denoted by 1, for a multi-story building. The building has one elevator shaft 3 or a plurality of elevator shafts, as required. The elevator system 1 shown here contains an elevator car 2 that can be moved vertically up and down in the elevator shaft 3 for the transport of people or goods to individual floors. The elevator car 2 has a car door 16. A landing door 8 is assigned to each floor 4. The elevator system 1 has a counterweight 5 connected to the elevator car 2 via supporting means (e.g. belts, steel cables). For moving the elevator car 2 and the counterweight 5, a drive unit 7, which is actuated by an elevator control unit 6, is provided. The drive unit 7 (e.g., a traction sheave drive) drives the supporting means and thus moves the car 2 and the counterweight 5 in opposite directions.

The landing door 8 is designed as a floor door of the elevator system 1, closes the elevator shaft 3 and forms the access from the floor 4 into the elevator shaft 3. If the person who is on the floor 4 wants to use the elevator, he or she operates an operating unit denoted by 17 by pressing a button, for example. In the present case, the operating unit 17 is designed as a call registering unit for inputting a floor call. After the floor call, the elevator car 2 moves to the floor on which the person made the floor call. To inform the person waiting for the elevator car 2, the landing door 8 has a floor indicator 10. The floor indicator 10 is used to display information regarding the location of the elevator car, such as the floor on which the elevator car is currently located. Instead of or in addition to this usually numerical indicator, the floor indicator 10 can be designed as a direction indicator. The direction indicator shows the direction in which the elevator car is currently moving. The floor indicator 10 could also indicate that an elevator car arrival is imminent, whether an elevator car is currently waiting behind the landing door, whether the elevator car is empty or already full, where the elevator car is going next, etc.

Figure 2:
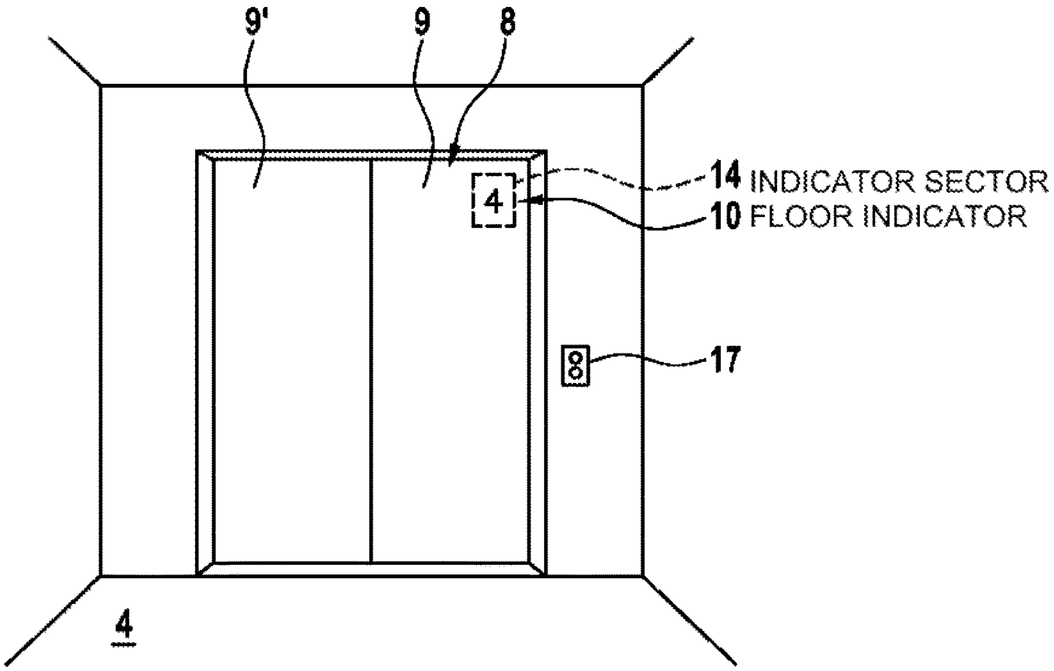
FIG. 2 is a simplified perspective view of a landing door with a door leaf with an activated floor indicator of the elevator system according to the invention.
Figure 3:
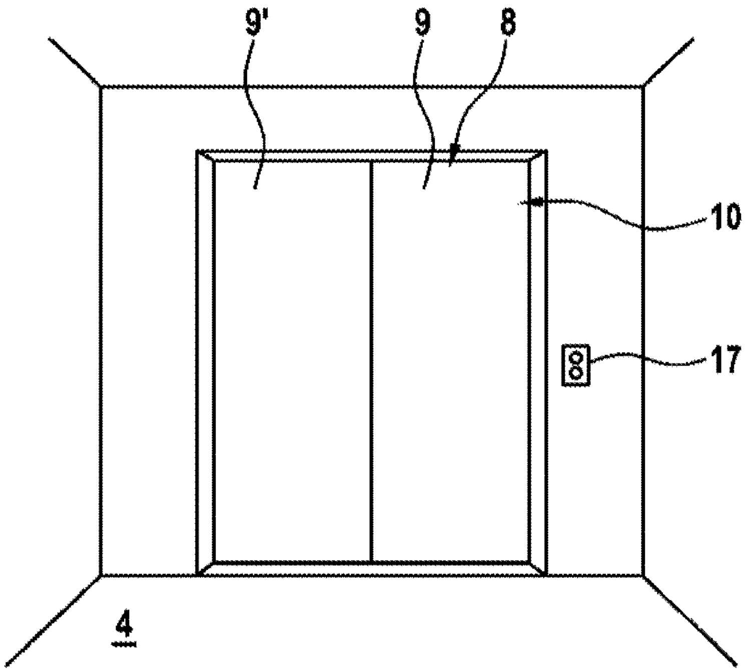
FIG. 3 shows the landing door with the door leaf with a deactivated floor indicator.

FIGS. 2 and 3 show the landing door 8 from the front from the floor 4. The landing door 8 has two door leaves, which can be moved in opposite directions in order to be moved between an open position and a closed position. The door leaf denoted by 9, which is on the right in FIG. 2 of the present exemplary embodiment, is equipped with a floor indicator 10. Of course, the left-hand door leaf, denoted by 9', could alternatively be equipped with a floor indicator 10. It would even be conceivable to equip both door leaves 9, 9' with floor indicators 10. For example, one floor indicator 10 could then visually indicate a number for the floor on which the elevator car is currently located, and the other floor indicator (not shown here) could visually indicate a direction indicator.

In FIG. 2, the floor indicator 10 is activated. The floor indicator 10 is activated by the elevator control unit 6, which sends the corresponding signals to the floor indicator 10 (see FIG. 1). The elevator control unit 6 and the floor indicator 10 may communicate with one another via a wire connection or wirelessly. The car call by pressing a button of the operating unit 17 is registered in the elevator control unit, whereupon the elevator car starts the car journey. The floor indicator 10 now shows the floor on which the elevator car is currently located. In FIG. 2, the number "4" is displayed; thus, the elevator car is on the fourth floor. The floor indicator 10 receives the corresponding signals for the floor information from the elevator control unit. At least one actuatable light source (not shown here) is installed in the door leaf 9 in a microperforated indicator sector indicated by dashed rectangle 14. The microperforation of the wall element creates light passage openings with small dimensions. To activate the floor indicator 10, the at least one light source is placed in an activated state, in which the at least one light source is illuminated. The light emitted by the at least one light source finally emerges via light passage openings of the microperforated indicator sector 14 of a wall element of the door leaf 9 as floor information in the manner described in detail below, and signals to the person on the floor the floor on which the elevator car is currently located. In FIGS. 2 and 3, the operating unit 17 is arranged in the landing door frame. However, it is also conceivable to provide an operating unit 17 that is integrated in the door leaf 9.

A special feature of the floor indicator 10 presented here, which is integrated in the door leaf 9, is that in the idle state, i.e. when it is not activated, it is practically not visible as such from the outside—at least when viewed from a distance. This state is shown in FIG. 3. When the at least one light source is deactivated, the light passage openings are barely visible to the elevator user because of their smallness, giving the person on the floor the impression of an almost ordinary door leaf.

Figure 5:
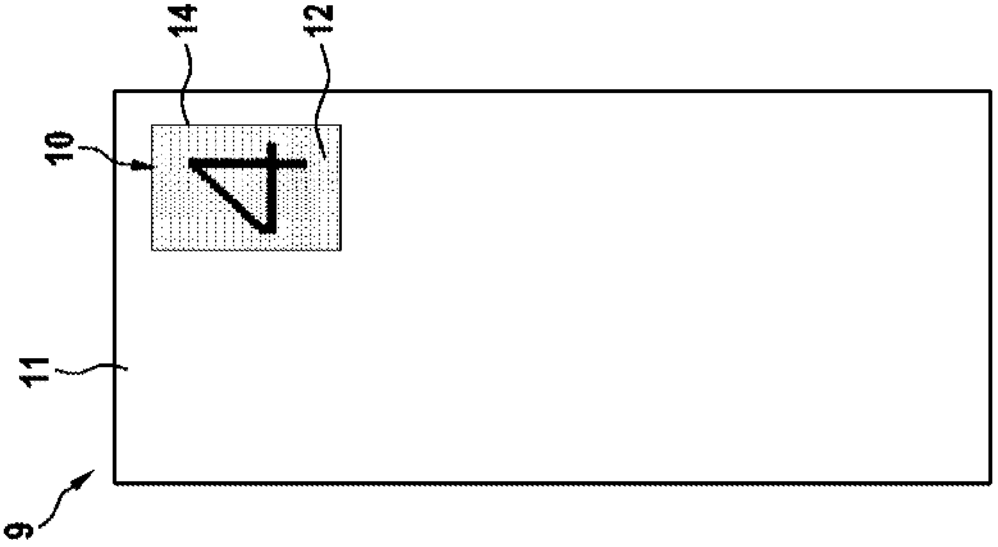
FIG. 5 shows the door leaf with an activated floor indicator.

FIG. 5 shows the door leaf 9 in a front view. The door leaf 9 has a wall element 11 that forms the front side of the door leaf. The wall element 11 is made of sheet metal and provides the supporting structure of the door leaf. This supporting structure supports the light sources arranged behind the wall element 11 for generating the floor information. These light sources are arranged in the indicator sector 14 in the upper, right corner region of the wall panel. In the indicator sector 14, the wall element has a plurality of very small holes for forming the light passage openings 12 in order to create a microperforated indicator sector. The microperforated indicator sector 14 can be seen to have light passage openings 12 in a perforated screen structure. The light passage openings 12 in a perforated screen structure ensure that any numbers, characters, logograms and symbols can be signaled with the floor indicator 10.

The microperforated indicator sector 14 occupies a limited area on the front side of the wall element 11 or the door leaf 9. Advantageously, the area assigned to the microperforated indicator sector 14 occupies no more than 20% of the total area of the front side of the door leaf 9. For example, the microperforated indicator sector 14 can be designed to be rectangular, as in the present exemplary embodiment.

So that different information may be displayed with the floor indicator 10, LEDs are used as light sources. These LEDs are arranged behind the wall element 11 and are therefore not shown here. The LEDs may form a planar LED array. Instead of the LED array, OLED films could also be provided. The LEDs can be activated and deactivated individually or may be activated and deactivated in groups depending on the application.

Figure 4:
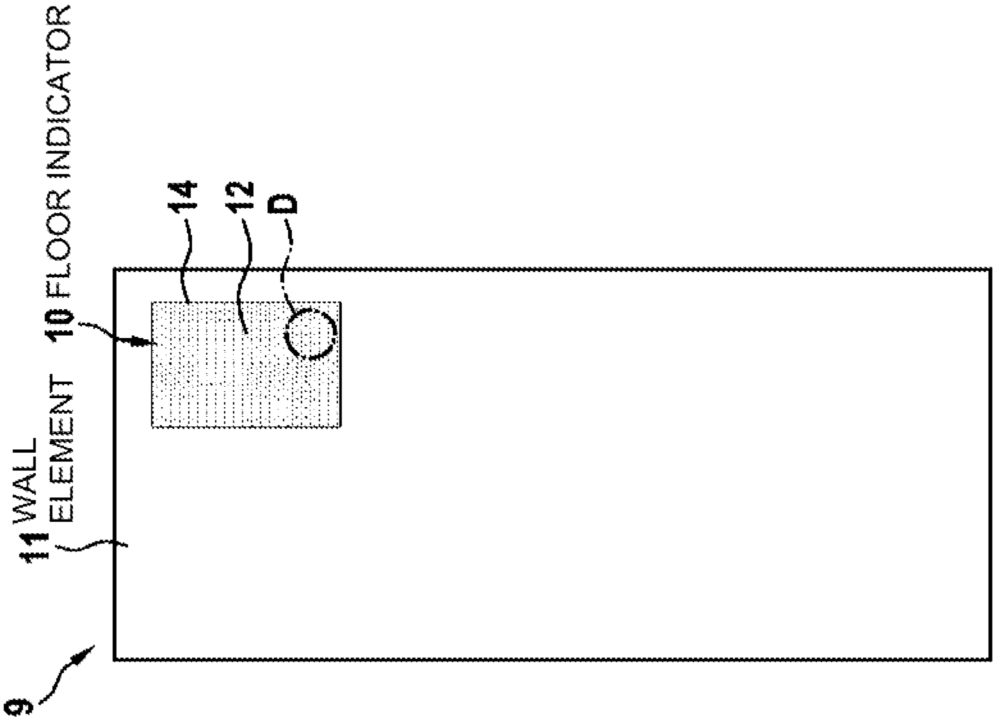
FIG. 4 shows a door leaf with a deactivated floor indicator.
Figure 6:
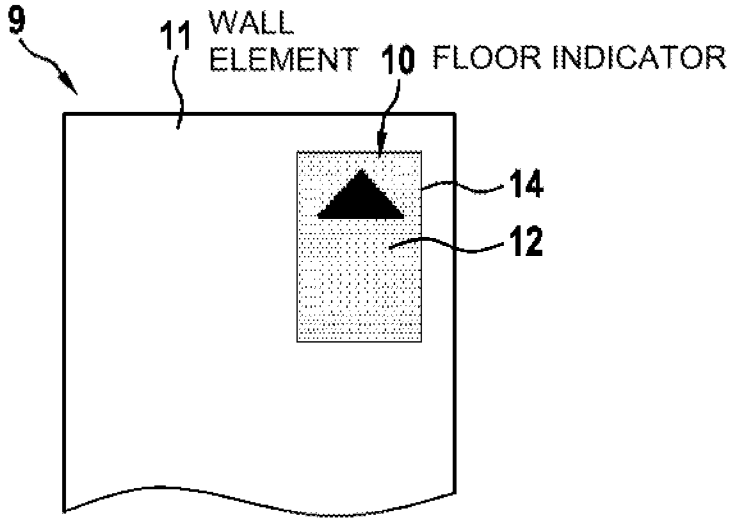
FIG. 6 shows the door leaf from FIG. 5 with an activated floor indicator, wherein the floor indicator outputs alternative floor information.

In FIG. 4, the LEDs of the floor indicator 10 are deactivated. In FIGS. 5 and 6, the LEDs of the floor indicator 10 are activated in each case. In FIG. 5, the floor indicator 10 displays a "4" as an example of a numerical indicator of floor information. As FIG. 6 shows by way of example, the floor indicator 10 can also be used to indicate the direction. The direction indicator could also be in the form of an arrow or "V" instead of the triangle.

Figure 7:
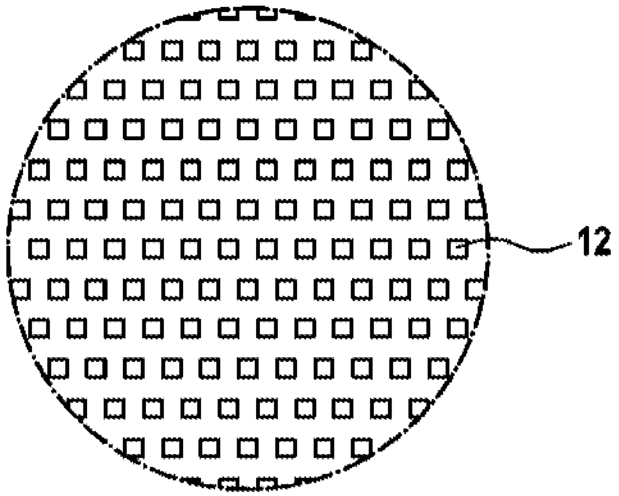
FIG. 7 shows a highly magnified detail view of an indicator sector of the door leaf of FIG. 4 (detail D of FIG. 4) with light passage openings in a perforated screen structure for the floor indicator.
Figure 8:
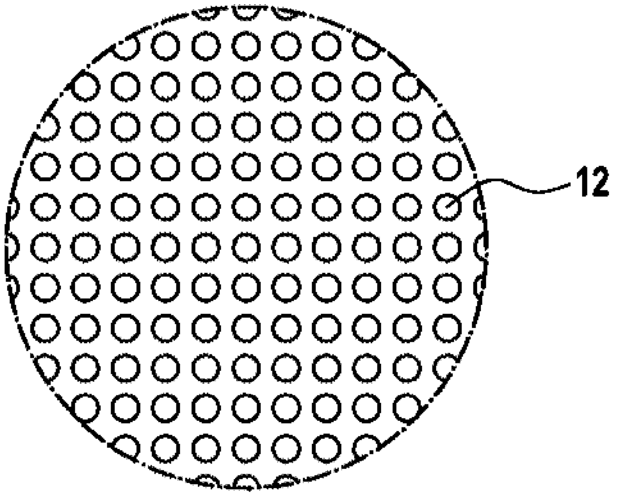
FIG. 8 shows an alternative design of light passage openings in a perforated screen structure for the floor indicator.

It can be seen from FIG. 7 (detail D in FIG. 4) that the light passage openings 12 form a perforated screen structure. A perforated screen structure is characterized by a large number of holes more or less evenly distributed on a surface. In the present case, the light passage openings 12 are designed as rectangular holes in the wall element 11. The respective light passage opening 12 can also be a circular hole in the wall element 11, as can be seen in FIG. 8. The light passage opening 12 of the perforated screen structure can have a side length or diameter of 0.5 mm to 1 mm in each case. However, even smaller holes are conceivable.

Figure 9:
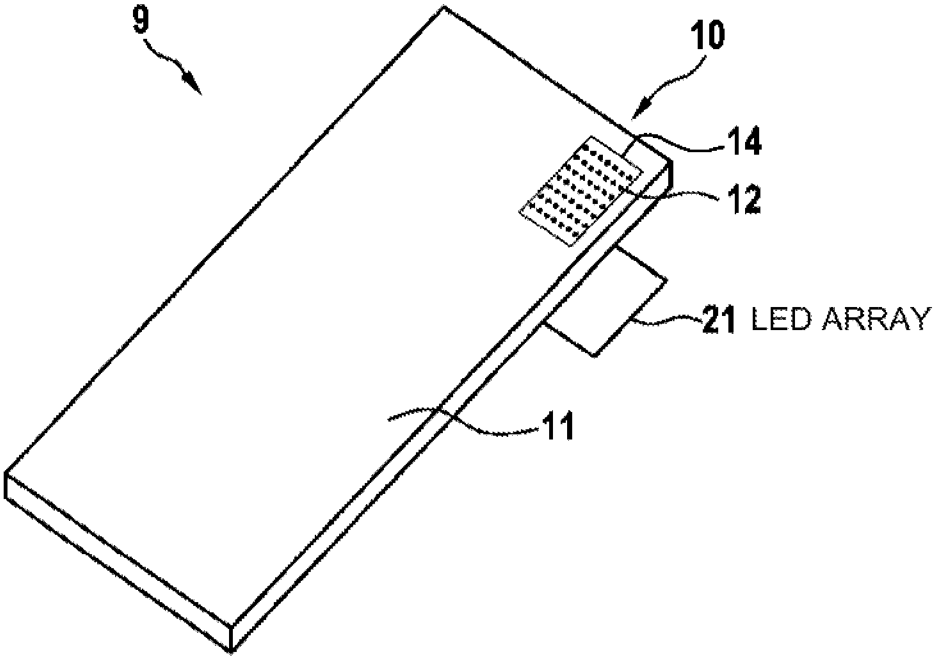
FIG. 9 is a perspective exploded view of a door leaf for the elevator system according to the invention.

Further details regarding the structure of a door leaf 9 with an integrated floor indicator 10 can be taken from FIG. 9. A decorative layer 13 (not shown, see FIG. 11) can substantially completely cover the free or visible front side of the wall element 11, except for the light passage openings. Not shown here for the sake of simplicity are non-visible regions of the wall element 11 which adjoin the top of the wall element 11 and, if the door leaf is installed in the elevator system to form, for example, a landing door designed as a sliding door, are accommodated in a transom or a door frame even in the open state.

The microperforated indicator sector 14 with the light passage openings 12 forming a perforated screen structure is arranged in a corner region of the door leaf 9 or the wall element 11. If the door leaf 9, which is rectangular in the front view, has two vertical longitudinal sides and transverse sides interconnecting them, the microperforated indicator sector 14 can be arranged in the corner region at the upper transverse side and the vertical outer longitudinal side, as in the present exemplary embodiment.

Figure 10:
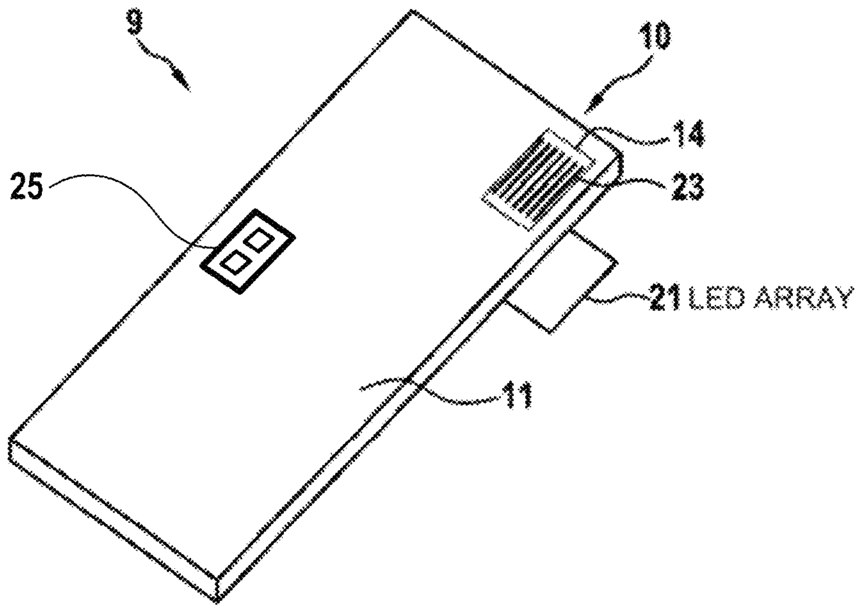
FIG. 10 shows a variant of the door leaf of FIG. 9.

As FIG. 10 shows, the microperforated indicator sector 14 can also have a plurality of light passage openings 23 formed by slits. This indicator sector 14 has slits 23 running parallel to one another in the wall element 11, wherein the slit width of the slits 23 is less than 1 mm.

An operating unit 25, for example in the form of a call registering unit for inputting a floor call, can be integrated into the door leaf 9. With such an arrangement, there is no need to provide operating units on the door frames, separate operating terminals or building walls on the floors. The operating region assigned to the operating unit 25 is preferably arranged at approximately mid-height in the region of an inner longitudinal side opposite the outer longitudinal side.

Below (behind) the wall element 11, an LED array denoted by 21 is arranged in the indicator sector 14. The LED array 21, shown only schematically, has a plurality of LEDs as light sources for operating the floor indicator 10. The LED array 21 can be surface-mounted or fixed at a distance to the wall element 11.

Figure 11:
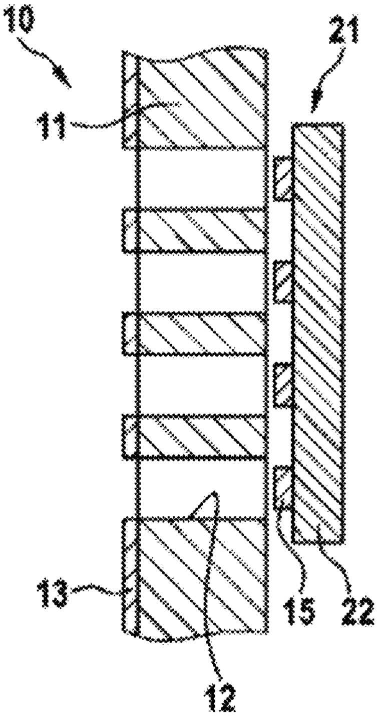
FIG. 11 is a simplified sectional representation of a floor indicator integrated in a door leaf.

Further details of possible designs of the floor indicator 10 for the landing door can be seen in FIG. 11. The floor indicator 10 according to FIG. 11 corresponds approximately to the floor indicator shown in FIG. 9, wherein a decorative layer 13 is additionally provided here. The LED array 21 comprises a circuit board 22 holding the LEDs 15. As an example, the LEDs are positioned directly behind the light passage openings 12. The decorative layer 13 can be a plastic film, a real wood veneer or a lacquer or paint layer. The decorative layer 13 can also be a laminate. PE, PP or PVC, for example, is suitable as the material for the plastic film. Depending on the choice of material, the plastic film can have a film thickness of 0.05 to 0.3 mm, for example. The plastic film can be a printed film. For example, a plastic film with a wood look can be selected as the decorative layer 13.

An LED 15 does not necessarily have to be assigned to each light passage opening 12. Light guide layer modules can be used to ensure that, after corresponding activation, light still reaches the outside from the LEDs 15 via the light passage openings 12.

As an alternative to the door leaf 9 of a landing door described above, the arrangement comprising the wall element 11 with a microperforated indicator sector 14 and actuatable light sources 15 arranged in the region of the microperforated indicator sector 14 behind the wall element 11 can also be used in other application locations of an elevator system 1. The arrangement can be designed as a wall panel with a floor indicator, which forms a wall element of an elevator car. However, such a wall panel or a similar wall panel could also be used as a car ceiling. Instead of a floor indicator, other visual indicators are also conceivable. The indicator integrated into the wall panel could, for example, be used to convey information to the elevator user to pass the time during a car journey, or to display special varying light patterns for optimum ride comfort for the user.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system having a landing door, the landing door including a door leaf and through which landing door an elevator car is accessible from a floor at which the landing door is positioned, the door leaf comprising:

a wall element having a microperforated indicator sector; and an actuatable light source installed at the door leaf and arranged in a region of the microperforated indicator sector behind the wall element opposite the floor, the light source and the microperforated indicator sector adapted to operate as a floor indicator of the elevator system, wherein the actuatable light source illuminates to display a current floor location of the elevator car when a selection is made on a call registering unit on the floor at which the landing door is positioned.

2. The elevator system according to claim 1 wherein the wall element is made of sheet metal.

3. The elevator system according to claim 1 wherein the microperforated indicator sector has a plurality of holes extending through the wall element forming light passage openings in a perforated screen structure to pass light from the light source.

4. The elevator system according to claim 3 wherein the holes have a round shape with a maximum diameter of 1 mm.

5. The elevator system according to claim 3 wherein the holes are formed as slits running parallel to one another and having a width less than 1 mm.

6. The elevator system according to claim 1 wherein the microperforated indicator sector is arranged in an edge region and/or a corner region of the door leaf.

7. The elevator system according to claim 1 wherein an area assigned to the microperforated indicator sector is no more than 20% of a total area of a front side of the door leaf.

8. The elevator system according to claim 1 wherein the light source is a plurality of individual light sources arranged on one level for the floor indicator and installed on the door leaf.

9. The elevator system according to claim 8 wherein each of the individual light sources is an LED and the individual light sources form a planar LED array.

10. The elevator system according to claim 9 including a light guide layer arranged in the indicator sector between the LED array and a rear side of the wall element.

11. The elevator system according to claim 8 wherein the microperforated indicator sector has a plurality of holes extending through the wall element forming light passage openings in a perforated screen structure to pass light from the light source, and wherein each of the individual light sources is assigned to an associated one of the light passage openings.

12. The elevator system according to claim 1 wherein the door leaf includes an operating unit adapted as the call registering unit for inputting a floor call.

13. A wall panel with a display function for an elevator system, the wall panel comprising:

a wall element having a front side and a rear side and including a microperforated indicator sector, the microperforated indicator sector permitting passage of light from the rear side to the front side; and an actuatable light source arranged in a region of the microperforated indicator sector at the rear side of the wall element, the microperforated indicator sector and the light source forming a visual indicator of information when the light source is actuated, wherein the actuatable light source illuminates to display a current floor location of an elevator car when a selection is made on a call registering unit on a floor at which the wall element is positioned.

14. An elevator system having a landing door, the landing door including a door leaf and through which landing door an elevator car is accessible from a floor at which the landing door is positioned, the door leaf comprising:

a wall element having a microperforated indicator sector; and an actuatable light source installed at the door leaf and arranged in a region of the microperforated indicator sector behind the wall element opposite the floor, the light source and the microperforated indicator sector adapted to operate as a floor indicator of the elevator system, where the door leaf includes an operating unit adapted as a call registering unit for inputting a floor call.

* * * * *